(12) United States Patent
Leisner et al.

(10) Patent No.: US 7,264,106 B2
(45) Date of Patent: Sep. 4, 2007

(54) POSITIONING DEVICE AND CONVEYOR SYSTEM WITH THE POSITIONING DEVICE

(75) Inventors: Ernst Leisner, Ludwigsburg (DE); Marco Willi, Stuttgart (DE); Boris Buesing, Stuttgart (DE)

(73) Assignee: Bosch Rexroth AG, Stuttgart (DE)

( * ) Notice: Subject to any disclaimer, the term of this patent is extended or adjusted under 35 U.S.C. 154(b) by 220 days.

(21) Appl. No.: 11/007,334

(22) Filed: Dec. 8, 2004

(65) Prior Publication Data

US 2005/0126883 A1   Jun. 16, 2005

(30) Foreign Application Priority Data

Dec. 12, 2003   (DE) ................................ 103 58 365

(51) Int. Cl.
*B65G 47/22* (2006.01)
(52) U.S. Cl. .................................... 198/345.3; 269/249
(58) Field of Classification Search ............. 198/345.1, 198/345.2, 345.3; 269/249
See application file for complete search history.

(56) References Cited

U.S. PATENT DOCUMENTS

| 4,757,890 | A | * | 7/1988 | Motoda | 198/345.3 |
| 4,917,226 | A | * | 4/1990 | Blocker | 198/345.1 |
| 5,277,527 | A | * | 1/1994 | Yokota et al. | 408/139 |
| 5,562,799 | A | * | 10/1996 | Ross et al. | 156/567 |
| 6,122,821 | A | * | 9/2000 | Dornieden et al. | 29/791 |
| 6,196,372 | B1 | * | 3/2001 | Rossi | 198/345.1 |
| 6,516,940 | B1 | * | 2/2003 | Hart et al. | 198/781.1 |
| 6,805,233 | B2 | * | 10/2004 | Verhaeghe | 198/750.6 |

FOREIGN PATENT DOCUMENTS

| DE | 3618584 | 12/1987 | |
| DE | 3832845 C1 * | 7/1989 | 198/345.3 |
| DE | 9106020 | 9/1992 | |
| DE | 41 11 498 A1 | 10/1992 | |
| DE | 19961259 | 6/2001 | |
| DE | 100 45 743 A1 | 3/2002 | |
| GB | 645920 | 11/1950 | |
| JP | 63057420 A * | 3/1988 | 198/345.1 |

* cited by examiner

*Primary Examiner*—Mark A Deuble
(74) *Attorney, Agent, or Firm*—Michael J. Striker

(57) ABSTRACT

The positioning device for positioning a movable conveyed goods carrier on a conveyor track in a clamped position includes a stop device (12); a movement device for a positioning movement and a drive (20) for driving the movement device. The movement device has a positioning element (36), which is engagable with a positioning counter element (46), so that the conveyed goods carrier (30) is clamped between the movement device and the stop device (12). The movement device also has a clamping arrangement including the positioning element (36) and two clamping parts (40), which is movable by the drive (20) from an out-of-engagement configuration into a clamping configuration, in which it exerts a holding force on the conveyed goods carrier (30) in cooperation with the stop device (12). A conveyor system including a conveyor chain or belt, the conveyor track and the positioning device are also described.

53 Claims, 3 Drawing Sheets

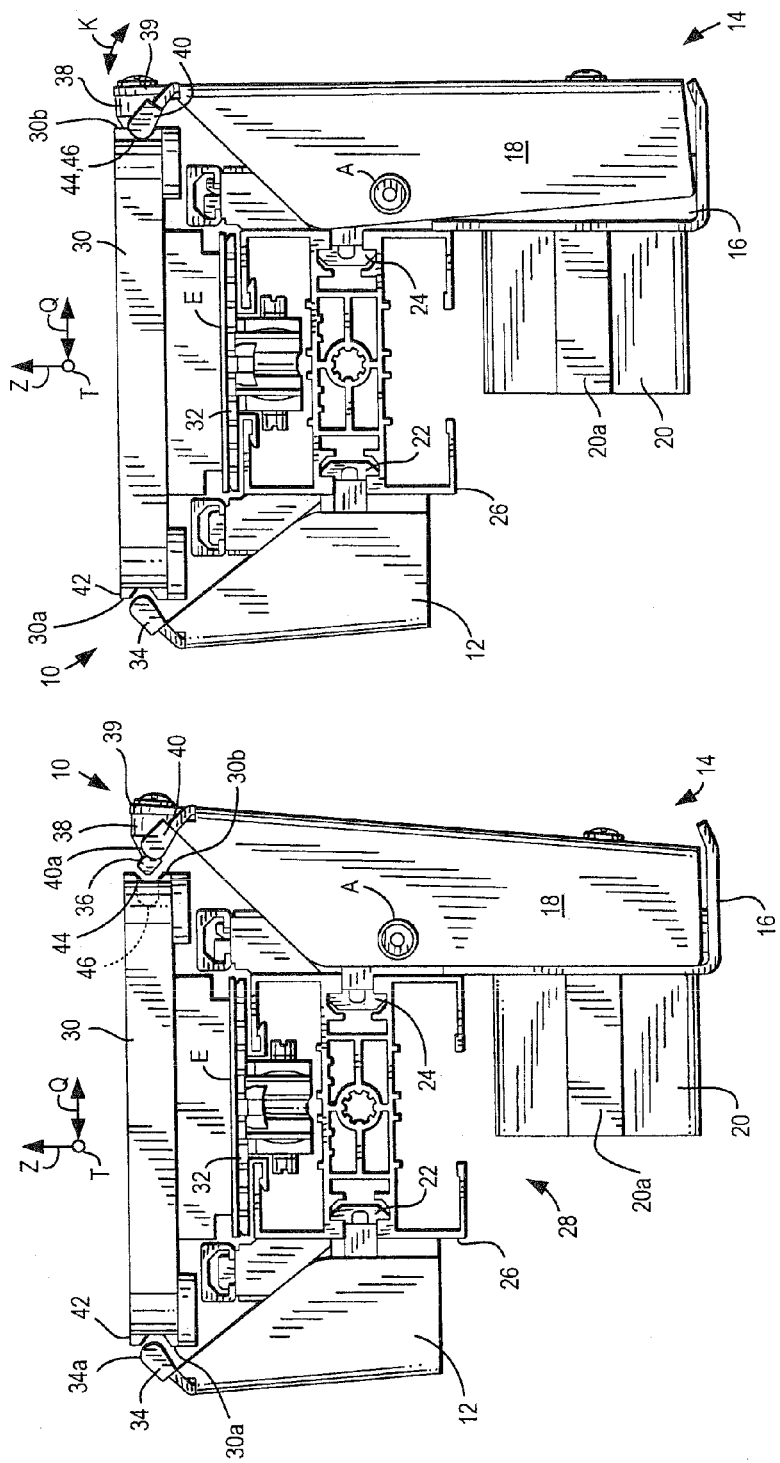

POSITIONING DEVICE AND CONVEYOR SYSTEM WITH THE POSITIONING DEVICE

BACKGROUND OF THE INVENTION

The present invention relates to a positioning device for positioning of a conveyed goods carrier movable on a conveyor track along a transport path in a transport direction in at least one clamped position having a predetermined relationship to the transport direction, wherein the positioning device comprises:

stop means;

movement means, which is spaced from the stop means and performs a positioning movement, and movement means drive, which drives the movement means so that the movement means performs the positioning movement; and wherein the movement means has a geometric positioning element, which is movable by the positioning movement from an out-of-engagement position into an engaged position, in which the geometric positioning element is engaged with a geometric positioning counter element so that the conveyed goods carrier is arranged between the movement means and the stop means in a clamped position.

Furthermore the present invention relates to a conveyor system for motion of a conveyed goods carrier in a transport or conveying direction along a transport path on a conveyor track. This conveyor system comprises the conveyor track, which extends both in the transport direction and also in a transport track orthogonal transverse direction, a drive means coupled with the conveyed goods carrier for motion transmission, especially at least one circulating drive means, preferably at least one circulating conveyor chain and/or at least one circulating conveyor belt. The conveyor system also includes a positioning device with the above-described features.

A positioning device and a transport system of the above-described type are known from DE 100 45 743 A1. The known positioning device with the geometric positioning element has a cylinder acted on with pressure, which has a clamping pin that is extendable from it and retractable into it acting as movement drive means. This clamping pin and pressurized cylinder form a piston-cylinder system.

The positioning device known from DE 100 45 743 A1 is arranged in a conveyor system so that the conveyed goods carrier is clamped between the stop means and the movement means and held and arranged in the desired clamped position when the clamping pin is in the engaged position, which corresponds to an extended position of the clamping pin from the pressurized cylinder.

The disadvantage of the known positioning device and/or the known transport system is that the clamping pin provides by form fit an exact arrangement of the conveyed goods carrier in the desired clamped position and also the holding forced required for holding the conveyed goods carrier in this clamped position. Since the conveyed goods carrier is usually arranged in the desired clamped position in order to perform the desired working and/or removing and/or loading processes on the conveyed goods and/or on the conveyed goods carrier, the required holding force can take a considerable size. Bending moments acting on the clamping pin extending from the pressurized cylinder in the clamping position can take a size, which permanently damages the positioning device and makes it unusable. The unusability can comprise impaired movability of the clamping pin by jamming in the cylinder or in an inaccurate positioning because of the shape changes.

SUMMARY OF THE INVENTION

It is an object of the present invention to provide a positioning device and conveyor system including the positioning device, with which a conveyed goods carrier can be reliably positioned over a long period of time in a desired clamped position.

This object and others, which will be made more apparent hereinafter, are attained in a positioning device for positioning a conveyed goods carrier movable on a conveyor track along a transport path in a transport direction in at least one clamped position having a predetermined relationship to the transport direction, wherein the positioning device comprises:

stop means;

movement means for performing a positioning movement, which is spaced from the stop means;

a movement means drive for driving the movement means so that the movement means performs the positioning movement; and wherein the movement means has a geometric positioning element, which is movable by the positioning movement from an out-of-engagement position into an engaged position, in which the geometric positioning element is engaged with a geometric positioning counter element so that the conveyed goods carrier is in a clamped position between the movement means and the stop means.

According to the invention the movement means has a special clamping arrangement comprising the geometric positioning element, which is movable by the movement means drive in a clamping motion, by which the clamping arrangement is brought from an out-of-engagement configuration into a clamped configuration, in which it exerts a holding force on the conveyed goods carrier in cooperation with the stop means, in order to hold it in a clamped position.

The holding force for holding the conveyed goods carrier in the clamped position by the special clamping arrangement provided by the geometric positioning element with this positioning device is such that the geometric positioning element is relieved in comparison to the positioning device of the prior art and less forces act on it. The service life of the geometric positioning element and the movement means are considerably increased because of that feature of the invention.

When according to the present invention the desired clamped position of the conveyed goods carrier is predetermined at least in relation to the transport direction, according to the invention the conveyed goods carrier is positioned with as great accuracy as possible in the transport direction. However the positioning accuracy is not required or not required to be as great in the two perpendicular directions to the transport direction. It is preferred that the conveyed goods carrier is arranged as accurately as possible both in the transport direction and also in the two directions perpendicular to the transport direction. Especially it is preferred that the conveyed goods carrier is positioned as accurately as possible in the transport direction and also in a conveyor track direction perpendicular to it.

In the designated out-of-engagement position the geometric positioning element is out of engagement with the geometric positioning counter element provided on the conveyed goods carrier. Similarly the clamping arrangement is out of engagement with the conveyed goods carrier and not in engagement with it in the designated not-engaged position.

The conveyed goods carrier is coupled or can be coupled in the conveyor system of this sort to a conveyor drive means provided in the conveyor system. The conveyor drive means is movable in the transport direction and takes the coupled conveyed goods carrier in the transport direction.

Now it is conceivable that, when the conveyed goods carrier is held in the clamped position, the drive means coupled with it is also held constrained. However in this sort of conveyor system it is desirable to have as high a degree of flexibility as possible and thus individual control of the individual conveyed goods carriers, which are found at the same time on the conveyor track. Thus the conveyed goods carrier is preferably arbitrarily coupled with the drive means or not according to choice of the operator. In that way the holding force applied by the clamping arrangement or device to hold the conveyed goods carrier in the clamped position can be reduced so that the conveyed goods carrier is uncoupled from the drive means, when the clamping arrangement is found in the clamped position. The term "uncoupled", in the sense of the present invention, is each state or condition in which the coupling force acting between the conveyed goods carrier and the drive means is reduced by change in position of the conveyed goods carrier and drive means relative to each other.

For example the conveyed goods carrier can bear on the drive means movable in the conveying or transport direction and can be moved in the transport direction by frictional engagement, so that the conveyed goods carrier can be lifted from the drive means by the clamping motion of the clamping arrangement to reduce the frictional engagement coupling force and raised finally into the clamped position.

DE 100 45 743 A1 teaches that a bearing part of the stop means can be displaceable in the transport direction in order to reduce the force applied to the geometric positioning element for putting the conveyed goods carrier in the clamping position. Also a bearing part of the stop means of the present invention can be made displaceable in this way to obtain these advantages. Preferably it is displaceable parallel to the transport direction against a spring force, so that a definite rest position can be achieved.

The clamping arrangement, however also the bearing part, should be constructed with sufficient strength or robustness, in order to be able to exert the required holding force on the conveyed goods carrier. However it should be constructed so that it does not damage the conveyed goods carrier in the clamping configuration. This can for example be achieved when the clamping arrangement and preferably also the bearing part has at least one plastic part, especially made from polyoxymethylene, which is provided for bearing on the conveyed goods carrier during engagement with it.

In order to be able to obtain as symmetric as possible an application of the forces of the clamping arrangement on the conveyed goods carrier in relation to the geometric position element, it is advantageous when the clamping arrangement comprises at least two engagement positions for contact with the conveyed goods carrier. At least one of these engagement positions is in front of the geometric positioning element and at least one other is behind it in the transport direction.

Great positioning accuracy can be obtained over a long service life or time interval, when the geometric positioning element is made from metal. Rapid machining or high-speed steel has proven satisfactory as this metal. High-speed steel has a sufficiently permanent strength with comparatively low cost.

In order to be able to maintain the exact shape of the geometric positioning element and also the exact shape of the conveyed goods carrier in the clamped position over a long time interval, the geometric positioning element can be hardened at least section-wise, preferably by carburization of the edge layers or by carbon coating.

A special advantage can be achieved when the positioning device is formed so that the positioning motion follows an at least partially curved trajectory, especially a circular arc-shaped portion. At least two orthogonal motion components are obtained in a single motion because the trajectory described by the geometric positioning element in the position movement has an at least partially section-wise curved course, which can be selected to serve different purposes. Thus the one motion component can be designed for positioning the conveyed goods carrier and the other motion component can be designed for decoupling the conveyed goods carrier from the conveyor drive means. An arbitrarily chosen curved path can be provided, perhaps by a cam track, which guides the geometric positioning element in its positioning motion. The same advantage of an at least section-wise curved motion can be attained independently of the presence of a geometric positioning element, also in a suitable manner for the clamping motion of the clamping arrangement.

The construction of the positioning device with a geometric positioning element and/or a clamping device for performing a curvilinear positioning motion and/or a curvilinear clamping motion in connection with the generic positioning device so that independent protection for it is found is advantageous.

A positioning device with only one geometric positioning element without the clamping arrangement can be chosen when the required holding forces are not great. A positioning device with only one clamping arrangement without a geometric positioning element can be chosen when positioning accuracy is not so very important, i.e. when the clamped position has comparatively large tolerances, or the conveyed goods carrier can be positioned with sufficient accuracy in the clamped position by halting the drive means or by a special apparatus, such as a detacher or isolator. In all other cases, as described above, the positioning device can be provided with the geometric positioning element and the clamping arrangement.

To simplify the assembly the movement means comprises a carrier element, on which the geometric positioning element and/or the clamping arrangement are provided. The carrier element can, as known in the state of the art, be movable linearly.

It is preferred that the carrier element for reasons of simplicity can be arranged so that it is pivotable or rotatable about a rotation axis, when the positioning device includes the above-described carrier element. The rotatability of the carrier element, among other aspects, is connected with a guiding action so that during construction a greater selection is possible for the movement drive device.

The movement drive means does not only drive the geometric positioning element for positioning movement, but also the clamping arrangement for the clamping motion. Correspondingly the movement drive means can be selected so that it is in a position to apply the required holding force in the clamping position when the clamping arrangement is found in its clamping position. The movement drive means can be a powered apparatus, such as a pneumatic, hydraulic, electrical, electromagnetic, mechanical or the like devices, for producing motion and transfer of force.

With a carrier element of a comparatively reduced size a predetermined force from a movement drive device can be increased or decreased to the required value at the place of engagement between the clamping arrangement and the conveyed goods carrier using leverage or lever action. The greatest structural freedom for transmission of the force exists when the carrier element is constructed like a rocker, wherein the geometric positioning element is arranged on one side of the carrier element in relation to the rotation or pivot axis and a coupling position of the movement drive device with the carrier element is provided on the other side of the carrier element.

The positioning device should be usable with as many different conveyor systems as possible, which can clearly be simplified when the positioning device comprises a base element, on which the carrier element is rotatably mounted. It is then sufficient to provide the base element in the respective conveyor system. Thus direct rotatable mounting of each carrier element on the conveyor system must be avoided.

According to an additional embodiment the movement drive device is supported on the base element so that it does not need to be mounted itself on the conveyor system. It is sufficient to provide only one base element with the carrier element and the movement drive device in the conveyor system. The base element can be provided with a suitable desirable standardized mounting structure for that purpose.

To further simplify the mounting the carrier element, the clamping arrangement and/or the geometric positioning element, the base element and the movement drive device can be assembled into a preassembled component group.

In contrast to the piston-like pin according to the state of the art in the case of the present invention the carrier element, the stop means and the base element can be formed as metal bent parts or also as molded plastic parts when the holding forces are small. In an extremely advantageous way exact machining of the aforementioned elements does not occur, since the desired positioning accuracy can be achieved by a suitable adjustment of these elements in the conveyor system. A suitable adjustment for each element is provided according to an advantageous embodiment of the present invention. The above-mentioned case of a preassembled component group is preferred for this reason, since it suffices to provide this sort of adjustment only on or in the base element, perhaps in its simplest form by providing elongated holes, along which the base element is displaceable continuously.

The above-described object is also attained by a conveyor system of the above-described type with one of the above-described positioning devices, so that a separate independent protection of the conveyor system of the above-described kind is attained, which includes a positioning device of the above-described type, whose movement means has a clamping arrangement separate from the geometric positioning element according to the above-description, which is drivable by the movement drive device in a clamping motion. According to choice the positioning device of the conveyor system can have at least one further feature from among the above-described preferred embodiments.

In order to hold the conveyed goods carrier in a continuously movable drive means so that the positioning device can accurately position the held conveyed goods carrier, the conveyor system can comprise at least one conveyor stopping device, which is adjustable between a running position, in which it allows motion of the conveyed goods carrier in the transport direction, and a stop position, in which it prevents motion of the conveyed goods carrier. The conveyor stopping device preferably can be embodied by an isolating or detaching device, which is known in itself.

Since an exact positioning at least in relation to the transport direction occurs in the clamping position, it is advantageous when the movement means of this sort is arranged on the conveyor path so that the positioning motion has a motion component substantially in a direction transverse or across the transport path. An exact positioning in the transport direction is attained with a motion component transverse to the transport path by engagement of a suitably selected geometric positioning element, perhaps a conical centering element, in an appropriate geometric positioning counter element, perhaps a conical receptacle. Also an exact positioning in the transverse direction across the transport path can be attained by the motion component substantially transverse to the transport path with suitably hard stop means, perhaps with a bearing part made from polyoxymethylene.

Basically it is conceivable to arrange the stop means and the movement means arbitrarily on the transport path. However, as necessary, motion of the stop means and/or the movement means on the transport path to and from it can be required. This sort of motion is not necessary when the stop means and the motion means are arranged on the transport path so that the transport path of the conveyed goods carrier runs between them. This latter arrangement is preferred.

To reliably avoid collisions the movement means can be arranged more accurately at a first transverse region of the transport path, and the stop means can be arranged at a second transverse region opposite from the first transverse region in the transport track transverse direction opposite from the movement means in the transport track transverse direction.

A transport system of the above-described type provides an especially reliable positioning of a conveyed goods carrier, when the positioning device includes the above-described geometric positioning element and/or the above-described clamping arrangement and is formed and arranged in relation to the transport path, so that the positioning movement and/or clamping motion has a motion component in the transport track transverse direction and an additional motion component in a direction orthogonal or perpendicular to the first motion component, especially in a direction for uncoupling the conveyed goods carrier from the drive means. The additional motion component can thus act to fix the conveyed goods carrier in relation to a second spatial direction. However the second motion component is preferably used for decoupling the conveyed goods carrier from the drive means in order to reduce the required holding forces and positioning forces on the conveyed goods carrier and to reduce the wear as needed. Also straight positioning motions and/or straight clamping motions are expressly included by this conveyor system. These straight motions then are inclined to a plane, which is spanned by the transport direction and the transport transverse direction. Also this sort of conveyor system is found to have automatic protection. This conveyor system can have at least one of the above-described features.

The following feature can be advantageous, especially in the case of a pivoting or rotation of the carrier element about the pivot axis according to a further embodiment of the invention: the clamping arrangement provided in the carrier element describes a circular arc or path in its clamping motion. The arrangement of the pivot axis can be selected so that the clamping motion has a motion component in the transport track transverse direction and an additional motion component in a direction for decoupling the conveyed goods carrier from the drive means in order to hold the conveyed goods carrier in the clamped position and simultaneously decouple it from the drive means. The motion components can both be adjusted by choice of the position and the length of the circular arc.

BRIEF DESCRIPTION OF THE DRAWING

The objects, features and advantages of the invention will now be described in more detail with the aid of the following description of the preferred embodiments, with reference to the accompanying figures in which:

FIG. 1 is a cross-sectional view of a first embodiment of a conveyor system with chain conveyor and positioning device mounted on a conveyor track, in which a conveyed material carrier is not positioned;

FIG. 2 is a cross-sectional view of the conveyor system shown in FIG. 1, but with the conveyed material carrier positioned;

DETAILED DESCRIPTION OF THE INVENTION

Figure 3:
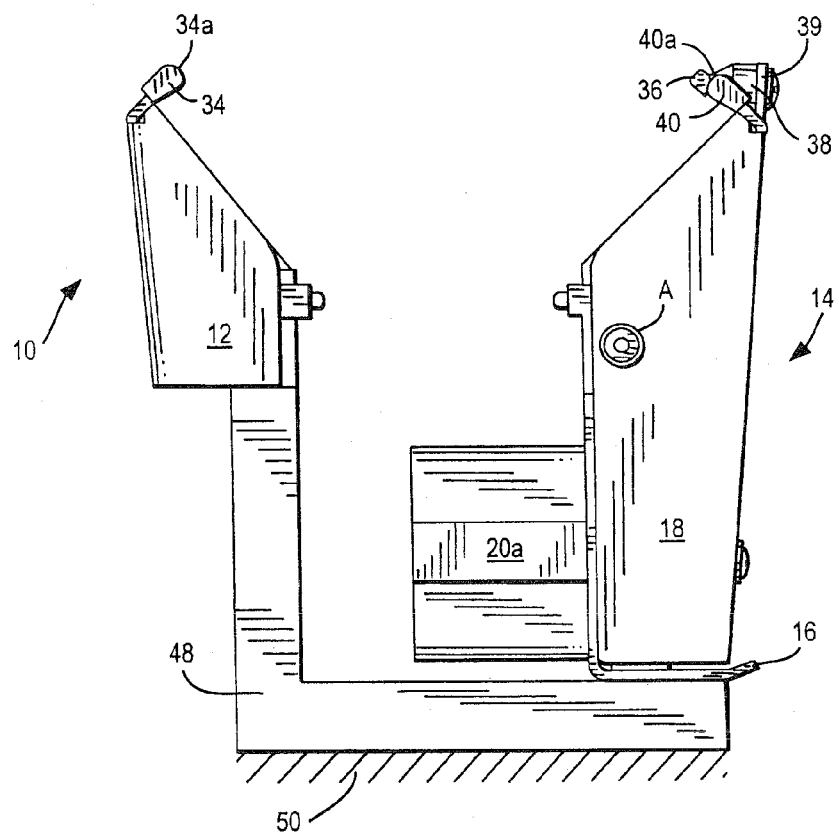
FIG. 3 is a cross-sectional view through an alternative embodiment of the conveyor system according to the invention similar to FIG. 1 but without the conveyed material carrier.

The positioning apparatus in FIGS. 1 to 4 is generally designated with 10. The positioning apparatus 10 includes stop means 12 and a component group 14. The component group 14 comprises a base element 16, a carrier element 18 pivotally mounted on the base element and a piston-cylinder unit 20 supported on the base element 16. The piston-cylinder unit 20, which is the movement means drive in this embodiment, comprises a cylinder 20a and a movable piston 20b. The cylinder 20a is attached to the base element 16 and the movable piston 20b is connected with the carrier element 18 for motion and force transmission.

In FIG. 1 the stop means 12 and the component group 14 are each held in position by means of a respective T-shaped tenon element 22 and 24 in a corresponding groove provided in a profiled section 26. The profiled section 26 forms a conveyor track 28, on which a conveyed goods carrier 20, perhaps a workpiece carrier, is movable in the transport direction T by means of a circulating endless conveyor chain 32. The transport direction T is perpendicular to the respective drawing planes in FIGS. 1 to 4.

The conveyor track 28 has a transport track transverse direction Q, which is perpendicular to the transport direction T, so that the transport direction T and the transport track transverse direction Q together define a bearing plane E. The underside of the conveyed goods carrier 30 rests on a stringer of the conveyor chain 32 in the bearing plane and is conveyed with it frictionally engaged by the chain.

Stop means 12 has two bearing parts 34 made of polyoxymethylene, of which only the front bearing part in the transport direction is seen in FIGS. 1 to 4. A geometric positioning element 36 is provided on the carrier element 18, which is formed on a pin 38, which is detachably secured, perhaps by a screw connection, to the carrier element 18. Respective clamping parts forming a clamping arrangement 40 are arranged on the carrier element 18 in front of and behind the geometric positioning element 36 in the transport direction. The respective clamping parts 40 and the bearing parts 34 are made from polyoxymethylene. The bearing parts 34 and clamping parts 40 shown in the figures are identically shaped so that structural complexity can be reduced.

Receptacles 42, 44 and 46 are provided in the respective edge regions 30a and 30b of the conveyed goods carrier 30. Receptacles 42, 44 and 46 extend into the conveyed goods carrier 30 in the transport track transverse direction Q. The receptacle 42 in the edge region 30a of the conveyed goods carrier at the stop means 12 is an engagement means receptacle, in which an engaging section 34a of the bearing part 34 engages in a form-fitting contact engagement with the conveyed goods carrier. The receptacles 44 in the other edge region 30b of the conveyed goods carrier associated with the component group 14 (movement means) are likewise engagement means receptacles, in which engaging sections 40a of the clamping parts 40 engage in a form-fitting contact engagement. A geometric positioning counter element 46 is formed in the edge region 30b of the conveyed goods carrier 30. The counter element 46 is only shown with dashed lines in FIG. 1, but otherwise is not shown in the figures, because it lies behind the engagement means receptacle 44 in the transport direction T in FIGS. 1 to 4. The geometric positioning element 36 engages with the geometric positioning counter element 46 in a form-fitting positional engagement in its engaged position. The contact engagement between the conveyed goods carrier 30 and the bearing parts 34 or the clamping parts 40 can be a frictional engagement in a less preferred embodiment.

The bearing parts 34 and the clamping parts 40 are shown in their not engaged position and the geometric positioning element 36 is shown in its out-of-engagement position in FIG. 1.

FIG. 2 shows the same view as in FIG. 1, except that the bearing parts 34 and the clamping parts 40 are shown clamped in their engaged positions in the conveyed goods carrier 30. The geometric positioning element 36 is shown in its engaged position in the geometric positioning counter element 46. These position changes are caused by extension of the piston 20b from the cylinder 20a. This extension again causes a rotation of the carrier element 18 about the rotation or pivot axis A on the base element 16 and thus a joint pivot motion of the clamping parts 40 and the geometric positioning element 36. The bearing parts 34 and the clamping parts 40 exert a holding force on the conveyed goods carrier so that the geometric positioning element is relieved and only the force required for displacement of the conveyed goods carrier 30 in the clamping position must be transmitted to them.

As shown in FIG. 2 with the arrow K, the rotation axis A extending substantially parallel to the transport direction T is arranged so that the clamping parts 40 perform a motion both in the transverse direction Q and also a motion in the lifting direction Z of the conveyed goods carrier 30 from the conveyor chain 32 during their motion from the not-engaged position into the clamping position. Of course usually the shapes of the engaging sections 34a and 40a of the bearing parts 34 and clamping parts 40 and the shapes of the engagement receptacles 42 and 44 are selected so that the conveyed goods carrier 30 is lifted from the conveyor chain on engagement of these parts in the appropriate sections. However this lifting motion can be aided in an advantageous manner by the partially circular path of the clamping parts. It is again expressly indicated that the "lifting" like disengaging does not require a complete lifting of the conveyed goods carrier 30 from the conveyor chain 32, so that an air gap is present between them. Furthermore "lifting", in the sense of this present invention, means a reduction of the weight of the conveyed goods carrier 30 on the conveyor chain 32, so that the sliding or slipping of the conveyor chain 32 under the conveyed goods carrier 30 is made easier. However a complete lifting of the conveyed goods carrier 30 from the conveyor chain 32 is preferred for reasons related to wear.

FIG. 3 shows an embodiment of the positioning means like that illustrated in FIGS. 1 and 2, in which the only difference is in the mounting of the stop means 12 and the component group 14 on stationary parts. In contrast to the embodiment shown in FIGS. 1 and 2 the stop means 12 and the component group 14 are mounted on a connecting angle 48, which is mounted in a fixed manner on a base 50, perhaps a machine table.

Figure 4:
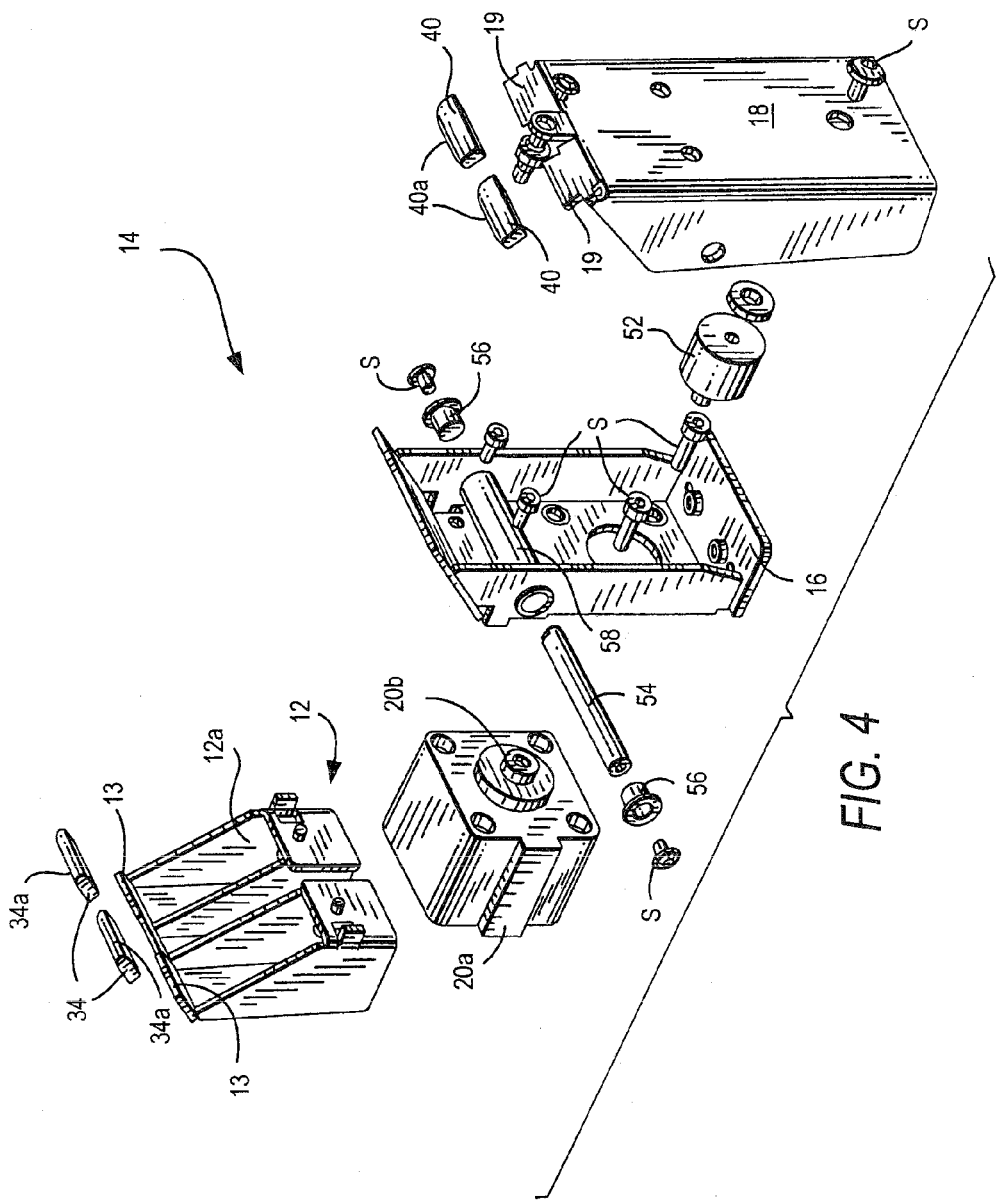
FIG. 4 is an exploded perspective view of a component group comprising a base element, carrier element, clamping arrangement, geometric positioning element and movement mans drive.

FIG. 4 shows an exploded perspective view of the positioning device 10 of FIGS. 1 to 3. Attachment means, which are screws, are generally designated with an S in FIG. 4. One skilled in the art would understand that these screws could be replaced by other attachment means.

As shown in FIG. 4, the stop means 12 comprises a plate-bent part 12*a*. Furthermore the base element 16 and the carrier element 18 are easily and economically formed as plate-bent parts, if necessary with welding of reinforced sleeves or covers. The bearing parts 34 and clamping parts 40 are similarly easily and economically connected to the suitable projections or extensions 13 and/or 19 formed on the plate-bent parts 12*a* and 18. In contrast, the pin 38 with the geometric positioning element 36 is screwed on a strap 39 formed on the carrier element 18.

A pad 52 is attached to the piston 20*b* of the piston-cylinder unit 20, which is facing with its free end toward the carrier element 18 for coupling with it. This pad 52 is preferably a rubber-metal pad, which is obtained as a so-called "Megipad". Motion inconsistencies between the pivoting motion of the carrier element 18 and the linear motion of the piston 20*b* can be compensated by this pad.

The rotation axis A is realized by a tubular part 54 with an elongated end terminating piece 56. The tubular part 54 is mounted in a suitable bearing sleeve 58 in the base element for rotation about the rotation axis A.

A possible adjustment means, with whose help the stop means 12 and/or the component group 14 can be fine adjusted in its orientation in relation to the transport path, is not shown in FIGS. 1 to 4.

The disclosure in German Patent Application 103 58 365.3 of Dec. 12, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a positioning unit and transport system with positioning means, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A positioning device for positioning a conveyed goods carrier movable on a conveyor track along a transport path in a transport direction (T) in at least one clamped position having a predetermined relationship to the transport direction, wherein the positioning device (10) comprises:
   stop means (12);
   movement means for performing at least one of a positioning movement and a clamping movement, said movement means being spaced from the stop means (12);
   movement means drive (20) for driving the movement means so that the movement means performs at least one of the positioning movement and the clamping movement;
   wherein the movement means has a geometric positioning element (36), said geometric positioning element being movable with the positioning movement from an out-of-engagement position into an engaged position, in which the geometric positioning element (36) is engaged with a geometric positioning counter element (46), so that the conveyed goods carrier (30) is arranged between the movement means and the stop means (12) in a clamped position;
   wherein the movement means has a clamping arrangement (40) provided separate from the geometric positioning element (36), which is movable by the movement means drive (20) in a clamping motion, by which the clamping arrangement (40) is brought from an out-of-engagement configuration into a clamping configuration, in which the clamping arrangement exerts a holding force on the conveyed goods carrier (30) in cooperation with the stop means (12), in order to hold the conveyed goods carrier (30) in the clamped position;
   wherein said movement means is structure so that the positioning motion and/or the clamping motion follows at least section-wise a curvilinear trajectory having one motion component in a transverse direction (Q) across the conveyor track (28) and an additional motion component perpendicular to said one motion component.

2. The positioning device as defined in claim 1, wherein the conveyed goods carrier (30) is coupled selectively with a conveyor drive member (32) movable in the transport direction (T) and the conveyed goods carrier (30) is decoupled from the conveyor drive member (32) when the clamping arrangement (40) is in said clamping configuration.

3. The positioning device as defined in claim 2, wherein the conveyed goods carrier (30) bears on the conveyor drive member (32) movable in the transport direction (T) and the conveyed goods carrier (30) is liftable by the clamping motion from the conveyor drive member (32).

4. The positioning device as defined in claim 1, wherein the stop means (12) has a bearing part (34) constructed for engagement with the conveyed goods carrier (30).

5. The positioning device as defined in claim 1, wherein said clamping arrangement (40) has at least one plastic part, which bears on the conveyed goods carrier (30).

6. The positioning device as defined in claim 5, wherein said at least one plastic part comprises polyoxymethylene.

7. The positioning device as defined in claim 4, wherein said bearing part (34) has at least one plastic part, which bears on the conveyed goods carrier (30).

8. The positioning device as defined in claim 7, wherein said at least one plastic part comprises polyoxymethylene.

9. The positioning device as defined in claim 1, wherein said clamping arrangement (40) comprises at least two engagement positions for contact with the conveyed goods carrier (30), of which a first engagement position is in front and a second engagement position is behind the geometric positioning element (36) in the transport direction.

10. The positioning device as defined in claim 1, wherein said geometric positioning element (36) is made of metal.

11. The positioning device as defined in claim 10, wherein said metal is rapid machining steel.

12. The positioning device as defined in claim 1, wherein said movement means comprises a carrier element (18) and said geometric positioning element (36) and/or said clamping arrangement (40) are mounted on said carrier element (18).

13. A positioning device for positioning a conveyed goods carrier movable on a conveyor track along a transport path in a transport direction (T) in at least one clamped position having a predetermined relationship to the transport direction, wherein the positioning device (10) comprises:
   stop means (12);
   movement means for performing at least one of a positioning movement and a clamping movement, said movement means being spaced from the stop means (12);
   movement means drive (20) for driving the movement means so that the movement means performs at least one of the positioning movement and the clamping movement;
   wherein the movement means has a geometric positioning element (36), which is movable with the positioning movement from an out-of-engagement position into an engaged position, in which the geometric positioning element (36) is engaged with a geometric positioning counter element (46), so that the conveyed goods carrier (30) is arranged between the movement means and the stop means (12) in a clamped position;
   wherein the movement means has a clamping arrangement (40) comprising the geometric positioning element (36), which is movable by the movement means drive (20) in a clamping motion, by which the clamping arrangement (40) is brought from an out-of-engagement configuration into a clamping configuration, in which the clamping arrangement exerts a holding force on the conveyed goods carrier (30) in cooperation with the stop means (12), in order to hold the conveyed goods carrier (30) in the clamped position;
   wherein said movement means is structured so that the positioning motion and/or the clamping motion follows at least section-wise a curvilinear trajectory.

14. The positioning device as defined in claim 13, wherein said curvilinear trajectory includes a circular arc-shaped portion.

15. The positioning device as defined in claim 13, wherein the clamping arrangement (40) is separate from the geometric positioning element (36).

16. The positioning device as defined in claim 13, wherein said movement means comprises a carrier element (18) and wherein said geometric positioning element (36) and/or said clamping arrangement (40) are mounted on said carrier element (18).

17. The positioning device as defined in claim 16, wherein the carrier element (18) is pivotable about a pivot axis (A).

18. The positioning device as defined in claim 17, wherein the carrier element (18) is rocker-shaped and said geometric positioning element (36) is arranged on one side of said carrier element with respect to said pivot axis (A) and a coupling position for said movement means drive (20) with said carrier element (18) is provided on another side of the carrier element (18).

19. The positioning device as defined in claim 17, further comprising a base element (16) and said carrier element (18) is rotatably mounted on the base element (16).

20. The positioning device as defined in claim 19, wherein said base element (16) supports said movement means drive (20).

21. The positioning device as defined in claim 16, further comprising a component group (14) and said component group (14) comprises said carrier element (18), said clamping arrangement (40), said geometric positioning element (36), said base element (16) and said movement means drive (20).

22. The positioning device as defined in claim 13, wherein the conveyed goods carrier (30) is coupled selectively with a conveyor drive member (32) movable in the transport direction (T) and the conveyed goods carrier (30) is decoupled from the conveyor drive member (32) when the clamping arrangement (40) is in said clamping configuration.

23. The positioning device as defined in claim 22, wherein the conveyed goods carrier (30) bears on the conveyor drive member (32) movable in the transport direction (T) and the conveyed goods carrier (30) is liftable by the clamping motion from the conveyor drive member (32).

24. The positioning device as defined in claim 13, wherein the stop means (12) has a bearing part (34) constructed for engagement with the conveyed goods carrier (30).

25. The positioning device as defined in claim 13, wherein said clamping arrangement (40) has at least one plastic part, which bears on the conveyed goods carrier (30), and said at least one plastic part is made from polyoxymethylene.

26. The positioning device as defined in claim 24, wherein said bearing part (34) has at least one plastic part, which bears on the conveyed goods carrier (30), and said at least one plastic part comprises polyoxymethylene.

27. The positioning device as defined in claim 13, wherein said clamping arrangement (40) has at least two engagement positions for contact with the conveyed goods carrier (30), of which a first engagement position is in front of and a second engagement position is behind the geometric positioning element (36) in the transport direction.

28. The positioning device as defined in claim 13, wherein said geometric positioning element (36) is made of metal.

29. A conveyor system for moving a conveyed goods carrier (30) along a transport path in a transport direction (T), said conveyor system comprising:
   a conveyor track (28) extending in the transport direction (T) and in a transverse direction (Q) perpendicular to the transport direction (T), said conveyed goods carrier (30) being movable along said transport path on said conveyor track (28);
   a conveyor drive member (32) and means for coupling said conveyor drive member (32) with said conveyed goods carrier (30) for motion transmission; and
   a positioning device (10) for positioning said conveyed goods carrier (30) movable on said conveyor track in said transport direction (T) in at least one clamped position having a predetermined relationship to the transport direction, wherein the positioning device (10) comprises:
      stop means (12);

movement means for performing at least one of a positioning movement and a clamping movement, said movement means being spaced from the stop means (12);

movement means drive (20) for driving the movement means so that the movement means performs at least one of the positioning movement and the clamping movement;

wherein the movement means has a geometric positioning element (36), which is movable with the positioning movement from an out-of-engagement position into an engaged position, in which the geometric positioning element (36) is engaged with a geometric positioning counter element (46), so that the conveyed goods carrier (30) is arranged between the movement means and the stop means (12) in a clamped position;

wherein the movement means has a clamping arrangement (40) provided separate from the geometric positioning element (36), which is movable by the movement means drive (20) in a clamping motion, by which the clamping arrangement (40) is brought from an out-of-engagement configuration into a clamping configuration, in which the clamping arrangement exerts a holding force on the conveyed goods carrier (30) in cooperation with the stop means (12), in order to hold the conveyed goods carrier (30) in the clamped position;

wherein the positioning device (10) is arranged in relation to the conveyor track (28) SO that the positioning movement and/or the clamping motion has one motion component in a transverse direction (Q) across the conveyor track (28) and an additional motion component perpendicular to said one motion component.

30. The conveyor system as defined in claim 29, wherein said movement means is structured so that the positioning movement and/or the clamping motion follows at least section-wise a curvilinear trajectory.

31. The conveyor system as defined in claim 29, wherein said conveyor drive member (32) is an endless circulating conveyor chain or an endless circulating conveyor belt.

32. The conveyor system as defined in claim 29, further comprising at least one conveyor stopping device and wherein said at least one conveyor stopping device is adjustable between a stopping position, in which said at least one conveyor stopping device prevents motion of said conveyed goods carrier in said transport direction (T), and a running position, in which said at least one conveyor stopping device allows motion of said conveyed goods carrier in said transport direction (T).

33. The conveyor system as defined in claim 32, wherein said at least one conveyor stopping device is an isolating device or a detaching device.

34. The conveyor system as defined in claim 32, wherein said movement means is mounted on said conveyor track (28) SO that the positioning movement has a motion component extending substantially in a transverse direction across the conveyor track.

35. The conveyor system as defined in claim 32, wherein stop means (12) and the movement means (18, 36, 40) are arranged on the conveyor track (28) so that the transport path runs between said stop means (12) and said movement means.

36. The conveyor system as defined in claim 32, wherein the movement means is arranged at a first transverse region of the conveyor track (28) and said stop means (12) is arranged at a second transverse region of the conveyor track (28) opposite from the first transverse region and from the movement means in a transverse direction (Q) across the conveyor track.

37. A conveyor system for moving a conveyed goods carrier (30) along a transport path in a transport direction (T), said conveyor system comprising a conveyor track (28) extending in the transport direction (T) and in a transverse direction (Q) perpendicular to the transport direction (T), said conveyed goods carrier (30) being moveable along said transport path on said conveyor track (28);

a conveyor drive member (32) and means for coupling said conveyor drive member (32) with said conveyed goods carrier (30) for motion transmission; and a positioning device (10) for positioning said conveyed goods carrier movable on said conveyor track in said transport direction (T) in at least one clamped position having a predetermined relationship to the transport direction, wherein the positioning device (10) comprises:

stop means (12);

movement means for performing at least one of a positioning movement and a clamping movement, said movement means being spaced from the stop means (12);

movement means drive (20) for driving the movement means so that the movement means performs at least one of the positioning movement and the clamping movement;

wherein the movement means has a geometric positioning element (36), which is movable with the positioning movement from an out-of-engagement position into an engaged position, in which the geometric positioning element (36) is engaged with a geometric positioning counter element (46), so that the conveyed goods carrier (30) is arranged between the movement means and the stop means (12) in a clamped position;

wherein the movement means has a clamping arrangement (40) comprising the geometric positioning element (36), which is movable by the movement means drive (20) in a clamping motion, by which the clamping arrangement (40) is brought from an out-of-engagement configuration into a clamping configuration, in which the clamping arrangement exerts a holding force on the conveyed goods carrier (30) in cooperation with the stop means (12), in order to hold the conveyed goods carrier (30) in the clamped position;

wherein the positioning device (10) is arranged in relation to the conveyor track (28) so that the positioning movement and/or the clamping motion has one motion component in a transverse direction (Q) across the conveyor track (28) and an additional motion component perpendicular to said one motion component.

38. The conveyor system as defined in claim 37, wherein said additional motion component is in another direction (Z) for decoupling the conveyed goods carrier (30) from the conveyor drive member (32).

39. The conveyor system as defined in claim 37, wherein said movement means is structured so that the positioning movement and/or the clamping motion follows at least section-wise a curvilinear trajectory.

40. The conveyor system as defined in claim 37, wherein the conveyor drive member (32) is an endless circulating conveyor chain or an endless circulating conveyor belt.

41. The conveyor system as defined in claim 37, wherein the clamping arrangement (40) is separate from the geometric positioning element (36).

42. The conveyor system as defined in claim 37, wherein said movement means comprises a carrier element (18) and said geometric positioning element (36) and/or said clamping arrangement (40) are mounted on said carrier element (18).

43. The conveyor system as defined in claim 42, wherein the carrier element (18) is pivotable about a pivot axis (A).

44. The conveyor system as defined in claim 43, wherein the carrier element (18) is rocker-shaped and said geometric positioning element (36) is arranged on one end of said carrier element with respect to said pivot axis (A) and a coupling position for said movement means drive (20) with said carrier element (18) is provided on another side of the carrier element (18).

45. The conveyor system as defined in claim 44, further comprising a base element (16) and wherein said carrier element (18) is rotatably mounted on the base element (16).

46. The conveyor system as defined in claim 45, wherein said base element (16) supports said movement means drive (20).

47. The conveyor system as defined in claim 44, further comprising a component group (14) and wherein said component group (14) comprises said carrier element (18), said clamping arrangement (40), said geometric positioning element (36), said base element (16) and said movement means drive (20).

48. The conveyor system as defined in claim 37, wherein the conveyed goods carrier (30) is coupled according to choice with a conveyor drive member (32) movable in the transport direction (T) and the conveyed goods carrier (30) is decoupled from the conveyor drive member (32) when the clamping arrangement (40) is in said clamping configuration.

49. The conveyor system as defined in claim 48, wherein the conveyed goods carrier (30) bears on the conveyor drive member (32) movable in the transport direction (T) and the conveyed goods carrier (30) is liftable by the clamping motion from the conveyor drive member (32).

50. The conveyor system as defined in claim 37, wherein the stop means (12) has a bearing part (34) constructed for engagement with the conveyed goods carrier (30).

51. The conveyor system as defined in claim 37, wherein said clamping arrangement (40) has at least one plastic part, which bears on the conveyed goods carrier (30), and said at least one plastic part is made from polyoxymethylene.

52. The conveyor system as defined in claim 50, wherein said bearing part (34) has at least one plastic part, which bears on the conveyed goods carrier (30), and said at least one plastic part comprises polyoxymethylene.

53. The conveyor system as defined in claim 37, wherein said clamping arrangement (40) has at least two engagement positions for contact with the conveyed goods carrier (30), of which a first engagement position is in front of and a second engagement position is behind the geometric positioning element (36) in the transport direction.

* * * * *